United States Patent
Kim et al.

(10) Patent No.: US 10,191,765 B2
(45) Date of Patent: Jan. 29, 2019

(54) TRANSACTION COMMIT OPERATIONS WITH THREAD DECOUPLING AND GROUPING OF I/O REQUESTS

(71) Applicants: Kyu Hwan Kim, Seoul (KR); Juchang Lee, Seoul (KR)

(72) Inventors: Kyu Hwan Kim, Seoul (KR); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 671 days.

(21) Appl. No.: 14/255,807

(22) Filed: Apr. 17, 2014

(65) Prior Publication Data

US 2015/0149426 A1 May 28, 2015

Related U.S. Application Data

(60) Provisional application No. 61/907,815, filed on Nov. 22, 2013.

(51) Int. Cl.
*G06F 17/30* (2006.01)
*G06F 9/46* (2006.01)
*G06F 3/06* (2006.01)

(52) U.S. Cl.
CPC ............ *G06F 9/467* (2013.01); *G06F 3/0604* (2013.01); *G06F 3/0655* (2013.01); *G06F 3/0674* (2013.01); *G06F 17/30312* (2013.01); *G06F 17/30377* (2013.01); *G06F 2003/0697* (2013.01)

(58) Field of Classification Search
CPC ................................................. G06F 17/30327
USPC ....................................................... 707/703
See application file for complete search history.

(56) References Cited

U.S. PATENT DOCUMENTS

| | | | |
|---|---|---|---|
| 5,696,967 A | 12/1997 | Hayashi et al. | |
| 5,950,212 A | 9/1999 | Anderson et al. | |
| 6,980,988 B1 | 12/2005 | Demers et al. | |
| 8,356,007 B2 | 1/2013 | Larson et al. | |
| 8,442,962 B2 | 5/2013 | Lee et al. | |
| 8,688,627 B2 * | 4/2014 | Arthursson | G06F 9/45504 707/608 |
| 9,003,162 B2 * | 4/2015 | Lomet | G06F 12/10 707/999.2 |
| 2004/0068507 A1 * | 4/2004 | Inoue | H04N 1/32122 |
| 2005/0063005 A1 * | 3/2005 | Phillips | H04L 12/66 358/1.15 |
| 2006/0218206 A1 | 9/2006 | Bourbonnais et al. | |

(Continued)

OTHER PUBLICATIONS

Extended European Search Report dated Feb. 23, 2015, from European Patent Application No. 14003673.2, 6 pp.

(Continued)

*Primary Examiner* — Kimberly L Wilson
(74) *Attorney, Agent, or Firm* — Klarquist Sparkman, LLP

(57) ABSTRACT

Innovations in the area of server-side processing when committing transactions to disk in a distributed database system can improve computational efficiency at database nodes and/or reduce network bandwidth utilization. For example, when transactions are committed in a database system, at a master node of the database system, a server uses different threads for certain processor-intensive operations and certain I/O-intensive operations. Or, as another example, when transactions are committed in a database system, at a master node of the database system, a server groups jobs for I/O requests.

20 Claims, 6 Drawing Sheets

(56) References Cited

U.S. PATENT DOCUMENTS

| | | | |
|---|---|---|---|
| 2006/0230408 A1* | 10/2006 | Frigo | G06F 9/30043 718/108 |
| 2009/0006598 A1* | 1/2009 | Cosmadopoulos | H04L 67/14 709/223 |
| 2009/0327854 A1* | 12/2009 | Chhajer | G06F 17/30306 715/227 |
| 2010/0100624 A1 | 4/2010 | Somogyi et al. | |
| 2010/0169284 A1 | 7/2010 | Walter et al. | |
| 2011/0041006 A1 | 2/2011 | Fowler | |
| 2011/0252000 A1 | 10/2011 | Diaconu et al. | |
| 2011/0258630 A1* | 10/2011 | Fee | G06F 9/4843 718/101 |
| 2012/0109895 A1* | 5/2012 | Zwilling | G06F 11/1471 707/648 |
| 2012/0131309 A1* | 5/2012 | Johnson | G06F 9/30 712/41 |
| 2012/0158805 A1 | 6/2012 | Andre et al. | |
| 2012/0166407 A1* | 6/2012 | Lee | G06F 17/30371 707/703 |
| 2013/0073513 A1 | 3/2013 | Kemper et al. | |
| 2013/0117235 A1 | 5/2013 | Schreter | |
| 2013/0117237 A1 | 5/2013 | Thomsen et al. | |
| 2013/0124475 A1 | 5/2013 | Hildenbrand et al. | |
| 2013/0166523 A1 | 6/2013 | Pathak et al. | |
| 2014/0130056 A1* | 5/2014 | Goodman | G06F 9/5044 718/104 |

OTHER PUBLICATIONS

Chang et al., "Handle Distributed Transactions with Federated Two-Phase Commit in WebSphere Federation Server Version 9.1," 12 pp., downloaded from http://www.ibm.com/developerworks/data/library/techarticle/dm-0611chang/index.html (2006).

Duckett, "The Two-Phase Commit Protocol," 4 pp., downloaded from http://courses.cs.vt.edu/~cs5204/fall00/distributedDBMS/duckett/tpcp.html (1995).

Gupta et al., "Revisiting Commit Processing in Distributed Database Systems," *SIGMOD Conf.—ACM Press*, pp. 486-197 (1997).

Lee et al., "High-Performance Transaction Processing in SAP HANA," *IEEE Data Eng. Bull.*, vol. 36, No. 2, pp. 28-33 (Jun. 2013).

Mohan et al., "Transaction Management in the R* Distributed Database Management System," *ACM Trans. on Database Systems*, vol. 11, No. 4, pp. 378-396 (1986).

More Process, "Two Phase Commit Protocol in Distributed Transactions," 2 pp., downloaded from http://www.moreprocess.com/sql/two-phase-commit-protocol-in-distributed-transactions (Apr. 17, 2013).

Oracle, "Distributed Transactions Concepts," Database Administrator's Guide Release 2 (9.2), 17 pp. (document not dated—downloaded on Apr. 18, 2014).

Oracle, "Two-Phase Commit Mechanism," Database Administrator's Guide 11g Release 1, 6 pp. (document not dated—downloaded on Apr. 18, 2014).

SAP AG, "SAP HANA Database—SQL Reference Manual, SAP HANA Appliance Software SPS 04," 158 pp. (2012).

Tolley, "Distributed Transactions and Two-Phase Commit," 8 pp., downloaded from http://blog.endpoint.com/2010/07/distributed-transactions-and-two-phase.html (2010).

Wikipedia, "Two-Phase Commit Protocol," 5 pp. (document marked: last modified Jan. 16, 2014).

Wilson, "Distributed Transactions and Two-Phase Commit," SAP White Paper, 39 pp. (2003).

\* cited by examiner software 180 implementing one or more innovations for a two-phase commit protocol with thread decoupling and grouping of I/O requests

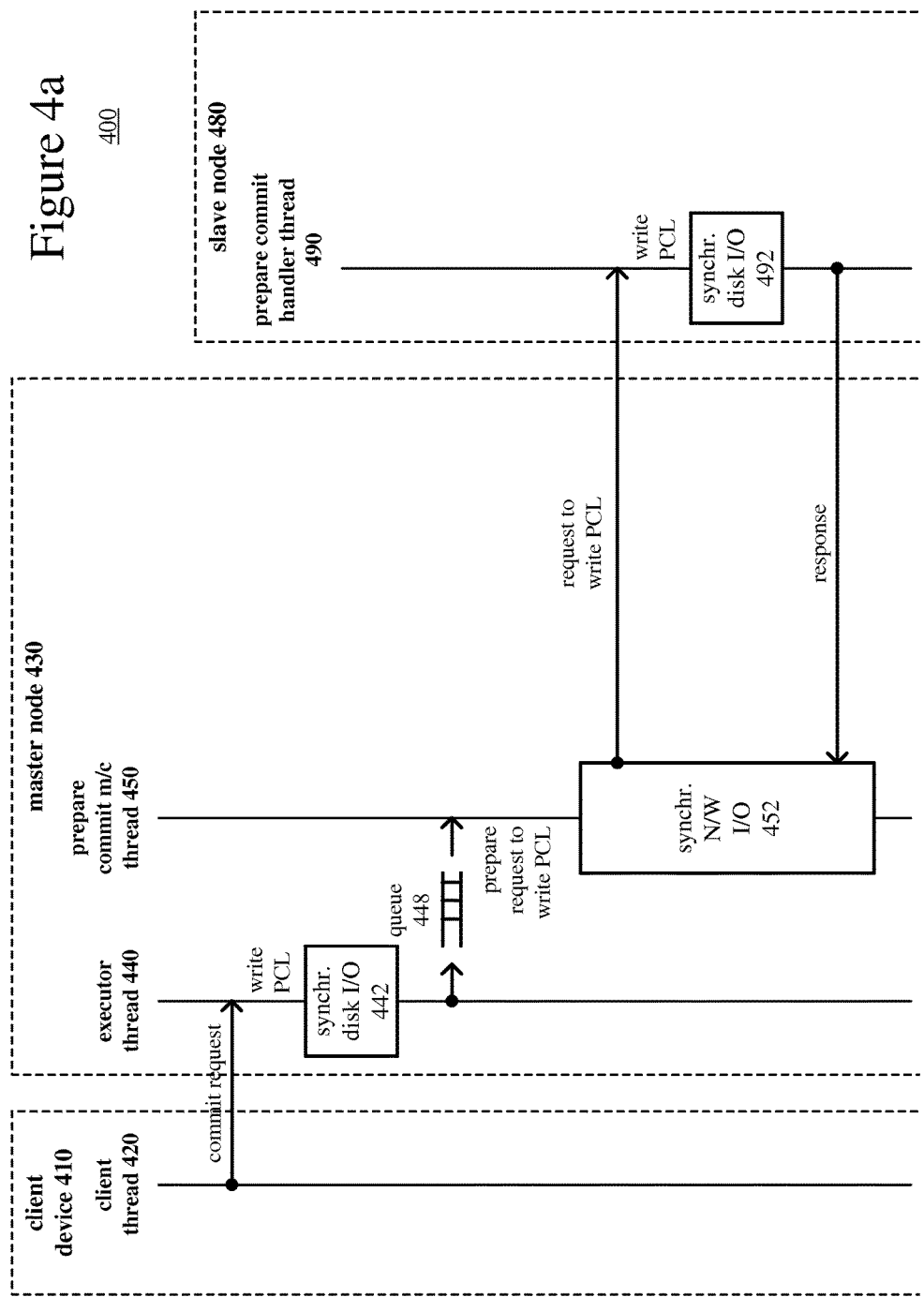

TRANSACTION COMMIT OPERATIONS WITH THREAD DECOUPLING AND GROUPING OF I/O REQUESTS

CROSS REFERENCE TO RELATED APPLICATION

This application claims the benefit of U.S. Provisional Patent Application No. 61/907,815, filed Nov. 22, 2013, the disclosure of which is hereby incorporated by reference.

FIELD

Server-side processing when committing transactions to disk in a distributed database system.

BACKGROUND

A database is an organized collection of data. In a distributed database system, a database can be spread across multiple database nodes, which can be located at different physical locations and operated by different server computers. For example, a database table can be split, or partitioned, such that different records of the table are stored at different database nodes. Values of a database can be inserted, deleted, edited or otherwise manipulated.

In a database system, a transaction is a logical operation or set of operations to manipulate data in a database (e.g., by insertion, deletion, editing, etc.). A transaction is typically processed as a unit of work involving the data. To process transactions reliably, a database system can follow a set of principles known by the acronym ACID, which stands for Atomicity, Consistency, Isolation and Durability. According to the principle of atomicity, if one part of a transaction fails, the entire transaction fails, and the state of the database is not changed. Outside the database system, a committed transaction is indivisible, and an aborted transaction does not happen. According to the principle of consistency, a transaction changes a database from one valid state to another valid state, following any rules, constraints, etc. that apply for the database. According to the principle of isolation, executing multiple transactions serially results in the same state as executing the transactions concurrently. According to the principle of durability, a committed transaction is stored persistently in the database.

A transaction log records changes in the database system. Entries of a transaction log can represent data changes or events (such as transactions being committed or rolled back). When a server "commits" a transaction, the server stores the results of the transaction in a persistent way in the database. That is, the results of the transaction are "persisted," or stored to "disk," which represents a hard drive, flash memory or some other non-volatile storage or memory. Typically, to commit transactions, the server persists transaction log entries for the transactions. Actual changed data might or might not be persisted at the same time, but in any case the state of the database can be restored using the persisted transaction log entries.

In some scenarios, previous approaches to committing transactions in a database system are inefficient in terms of computational efficiency and/or network bandwidth utilization. In particular, waiting for completion of disk input/output ("I/O") operations and network I/O operations can result in wasted processing resources in many situations.

SUMMARY

In summary, the detailed description presents innovations in the area of server-side processing when committing transactions to disk in a distributed database system. In many scenarios, the innovations can improve computational efficiency at database nodes and/or reduce network bandwidth utilization.

According to a first aspect of the innovations described herein, when transactions are committed in a database system, at a master node of the database system, a server uses different threads for certain processor-intensive operations and certain I/O-intensive operations. For example, the server receives (from a client) a request to commit transactions to disk. In response, the server performs operations to commit the transactions to disk. As part of the operations, with a first thread at the master node, the server defines a job to write a log to disk at a slave node of the database system. The server can then push the job to a queue (e.g., a queue associated with the slave node, where different slave nodes are associated with different queues at the master node) and release the first thread. With a second thread at the master node, the server sends a request to perform the job to the slave node.

The log can be a prepare commit log ("PCL") according to a two-phase commit protocol. In this case, the request to perform the job of writing the PCL to disk is a synchronous network I/O request. The server can also send, to each of one or more other slave nodes, a corresponding synchronous network I/O request to perform a corresponding job to write a PCL for the transactions to disk at the other slave node. The second thread waits for a response to the (write PCL) request sent to a slave node. After receiving the response, the server can write a commit log ("CL") to disk at the master node as part of a synchronous disk I/O request.

Or, the log can be a CL according to a two-phase commit protocol. In this case, the request to perform the job of writing the CL to disk is an asynchronous network I/O request. The server can also send, to each of one or more other slave nodes, a corresponding asynchronous network I/O request to perform a corresponding job to write a CL for the transactions to disk at the other slave node. The second thread continues without waiting for a response to the (write CL) request sent to a slave node. The server sends (to the client) an acknowledgement of the request to commit transactions.

According to another aspect of the innovations described herein, when transactions are committed in a database system, at a master node of the database system, a server groups jobs for I/O requests. For example, the server receives a request to commit transactions to disk. In response, the server performs operations to commit the transactions to disk. As part of the operations, the server defines a job to write a log (e.g., PCL, CL) to disk at a slave node and pushes the job to a queue (e.g., a queue associated with the slave node). Different slave nodes can be associated with different queues at the master node. The server sends a request to perform the job to the slave node (e.g., as part of a synchronous network I/O request to write one or more PCLs, or as part of an asynchronous network I/O request to write one or more CLs). The server can also send, to each of one or more other slave nodes, a corresponding request to perform a corresponding job to write a log for the transactions to disk at the other slave node.

According to another aspect of the innovations described herein, when transactions are committed in a database system, at a slave node of the database system, a server processes a group of jobs for disk I/O requests. For example, the server receives a request for a group of multiple jobs, where each of the multiple jobs relates to writing a PCL for transactions to disk. The server writes the PCLs for the multiple jobs to disk as part of a synchronous disk I/O request. For example, a thread at the slave node writes the PCLs to an in-memory buffer. When requested, the thread triggers the synchronous disk I/O request then waits for completion of the synchronous disk I/O request.

The foregoing and other objects, features, and advantages of the invention will become more apparent from the following detailed description, which proceeds with reference to the accompanying figures.

BRIEF DESCRIPTION OF THE DRAWINGS

FIGS. 4a and 4b are a diagram illustrating aspects of a two-phase commit protocol with thread decoupling and grouping of I/O requests.

DETAILED DESCRIPTION

The detailed description presents innovations in the area of server-side processing when committing transactions to disk in a distributed database system. In many scenarios, the innovations can improve computational efficiency at database nodes and/or reduce network bandwidth utilization.

The transactions are committed in a distributed database system. A distributed database system has two or more database nodes. Depending on implementation, each of the different database nodes can be operated by a corresponding, different server. Or, multiple database nodes can be operated by the same server.

I. Example Computing Systems and Cloud Computing Environments.

Figure 1:
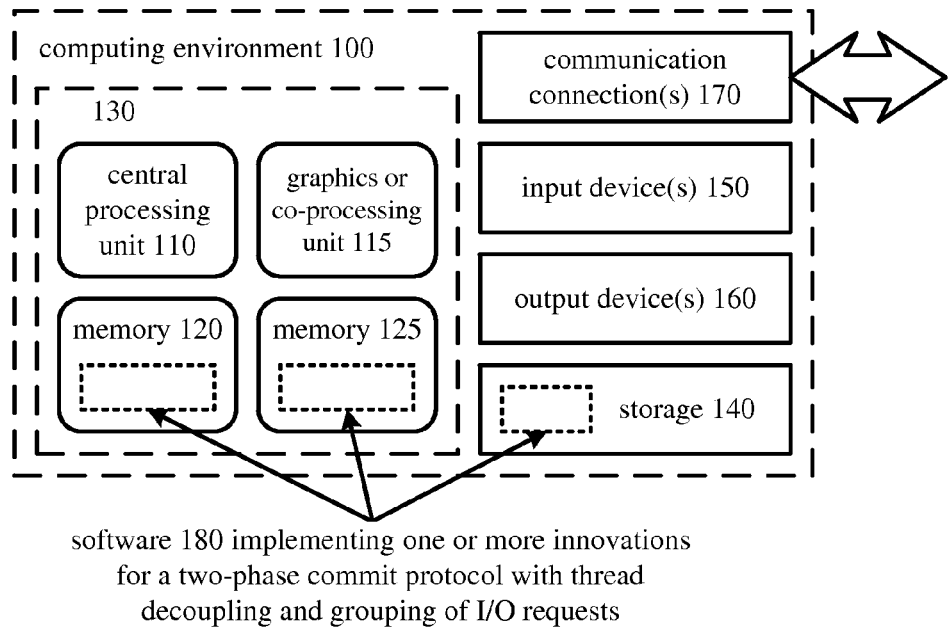
FIG. 1 is a diagram illustrating an example computing system in which some described embodiments can be implemented.

FIG. 1 depicts a generalized example of a suitable computing system (100) in which the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for a two-phase commit protocol with thread decoupling and grouping of I/O requests, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for a two-phase commit protocol with thread decoupling and grouping of I/O requests.

The input device(s) (150) may be a touch input device such as a keyboard, mouse, pen, or trackball, a voice input device, a scanning device, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 2:
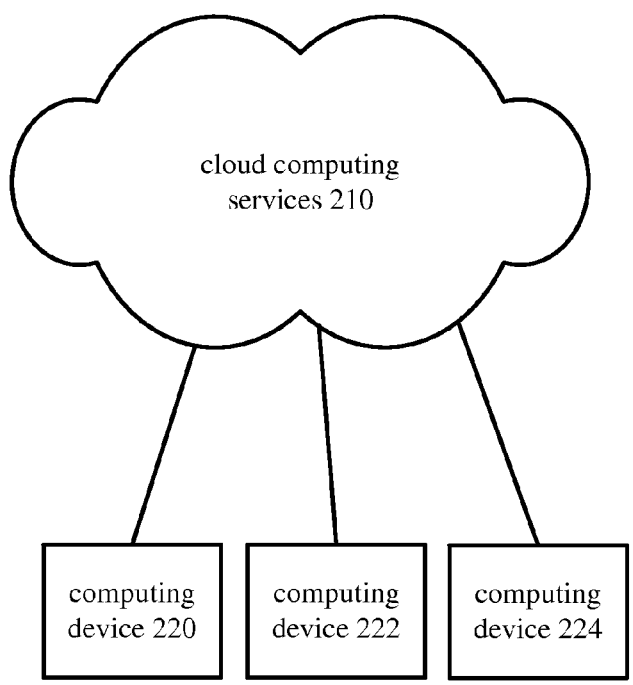
FIG. 2 is a diagram illustrating an example cloud computing environment in which some described embodiments can be implemented.

FIG. 2 depicts an example cloud computing environment (200) in which described innovations can be implemented. The cloud computing environment (200) includes cloud computing services (210). The cloud computing services (210) can include various types of cloud computing resources, such as computer servers, data storage repositories, networking resources, etc. The cloud computing services (210) can be centrally located (e.g., provided by a data center of a business or organization) or distributed (e.g., provided by various computing resources located at different locations, such as different data centers and/or located in different cities or countries).

The cloud computing services (210) are utilized by various types of computing devices (e.g., client computing devices), such as computing devices (220, 222, and 224). For example, the computing devices (e.g., 220, 222, and 224) can be computers (e.g., desktop or laptop computers), mobile devices (e.g., tablet computers or smart phones), or other types of computing devices. For example, the computing devices (e.g., 220, 222, and 224) can utilize the cloud computing services (210) to perform computing operators (e.g., data processing, data storage, and the like).

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 1, computer-readable storage media include memory (120 and 125), and storage (140). The term computer-readable storage media does not include signals and carrier waves. In addition, the term computer-readable storage media does not include communication connections (e.g., 170).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

II. Examples of Two-Phase Commit Protocols with Thread Decoupling and Grouping of I/O Requests.

A number of factors can influence the efficiency of a distributed database system. For example, threads or processes that block on input/output ("I/O") activity (such as disk I/O operations or network I/O operations) can significantly hurt the performance of the system if the threads or processes might otherwise be performing useful operations. As another example, sending frequent, small requests over a network can adversely impact network bandwidth utilization, when the signaling overhead for such requests is disproportionately high.

This section describes innovations in server-side processing when committing transactions in a distributed database system. For example, a server decouples threads that handle certain processor-intensive operations from threads that handle certain I/O-intensive operations. This allows the threads that handle the processor-intensive operations to remain free to handle other requests (e.g., other requests from clients) while I/O requests are pending. Or, as another example, a server groups jobs for an I/O request (e.g., pushing the jobs into a queue), then uses a single I/O request for the group. This is typically more efficient than blocking on separate per-job I/O requests, sent individually. These innovations, which can be used separately or in combination, can improve performance for a two-phase commit protocol.

Figure 3:
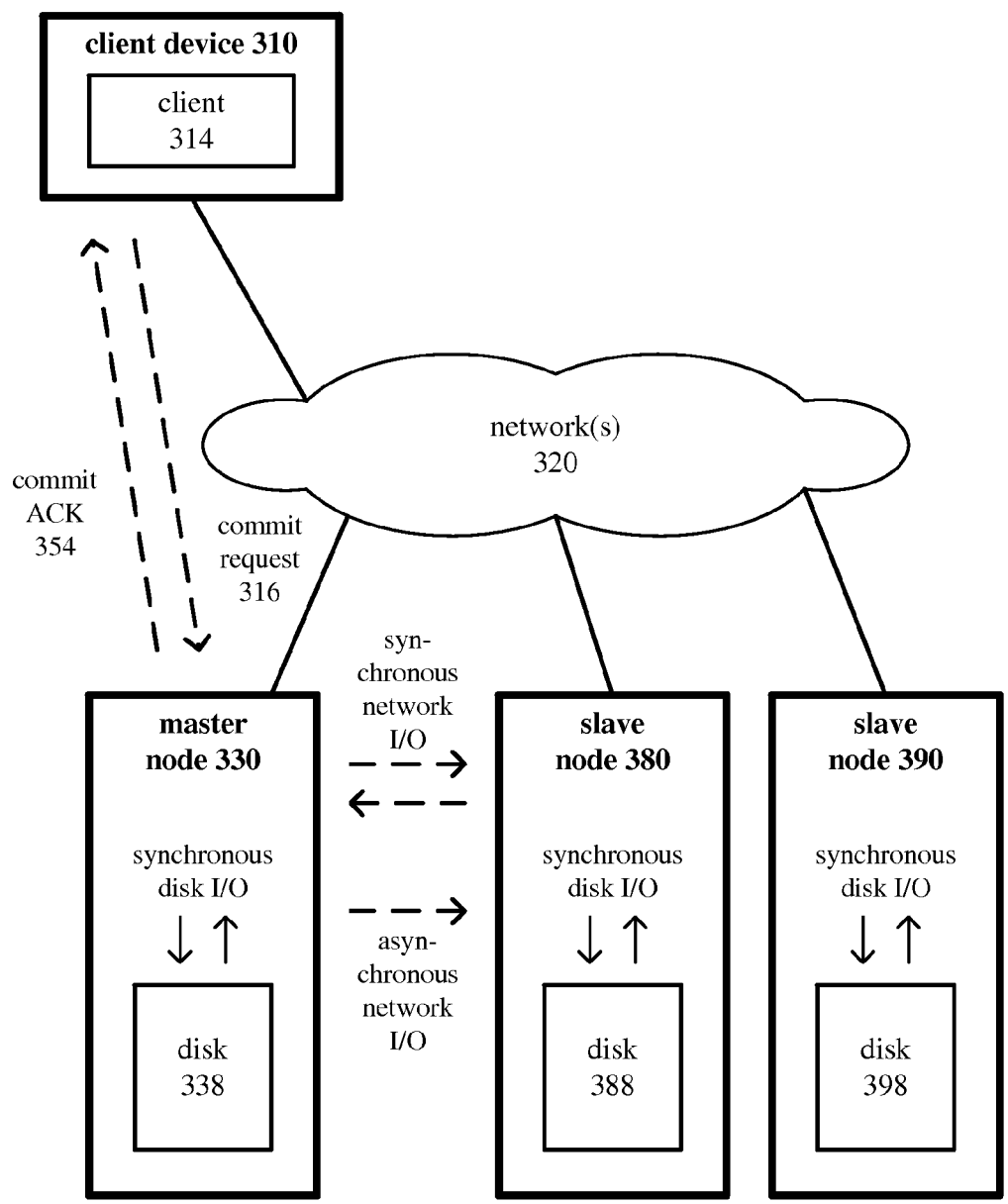
FIG. 3 is a diagram illustrating a database system that implements a two-phase commit protocol with thread decoupling and grouping of I/O requests.

FIG. 3 shows a database environment (300) that includes a client device (310) and multiple nodes of a distributed database system. The multiple nodes include a master node (330) operated by a server and two slave nodes (380, 390) operated by servers. The database environment (300) can have more or fewer slave nodes. One or more networks (320) separate the client device (310) and nodes (330, 380, 390).

The client device (310) includes a database client (314) (or simply "client"). The client (314) can work with any of multiple applications or a single application. Or, an application and the client (314) can be combined, such that the client (314) is part of the application. In FIG. 3, the client (314) sends a request (316) to the master node (330) to commit transactions.

Multiple types of threads execute at the master node (330) to improve performance. In the master node (330), executor threads handle incoming user requests from the client (314) and any other clients. In FIG. 3, the incoming user requests include the request (316) to commit transactions. For example, the executor threads are dedicated to processing structured query language ("SQL") requests, which tends to be processor-intensive activity. In example implementations, the number n of executor threads is the same as the number n of logical cores in hardware at the master node (330), which may help avoid context switching overhead.

Processing of the commit request (316) also involves synchronous disk I/O operations with the disk (338) at the master node (330), to write one or more logs for the transactions to the disk (338). The disk (338) represents a hard drive, flash memory or some other non-volatile storage or memory. Processing of the request (316) further involves network I/O operations with one or more of the slave nodes (380, 390), including synchronous network I/O operations and asynchronous network I/O operations. At each slave node (380, 390), operations performed at the request of the master node (330) for the commit request (316) involve synchronous disk I/O with the disk (388, 398) at the slave node (380, 390). The master node (330) eventually sends an acknowledgement (354) of the request to commit transactions back to the client (314).

To improve throughput in the database system, the n executor threads at the master node (330) are dedicated to processor-intensive tasks, and are typically not blocked waiting for I/O requests to complete. One or more other threads, as explained below, at the master node (330) handle the I/O-intensive tasks of the request (316) to commit transactions. The way the master node (330) handles disk I/O requests for the disk (338) and network I/O requests to slave nodes (380, 390) can significantly affect overall performance.

Figure 4B:
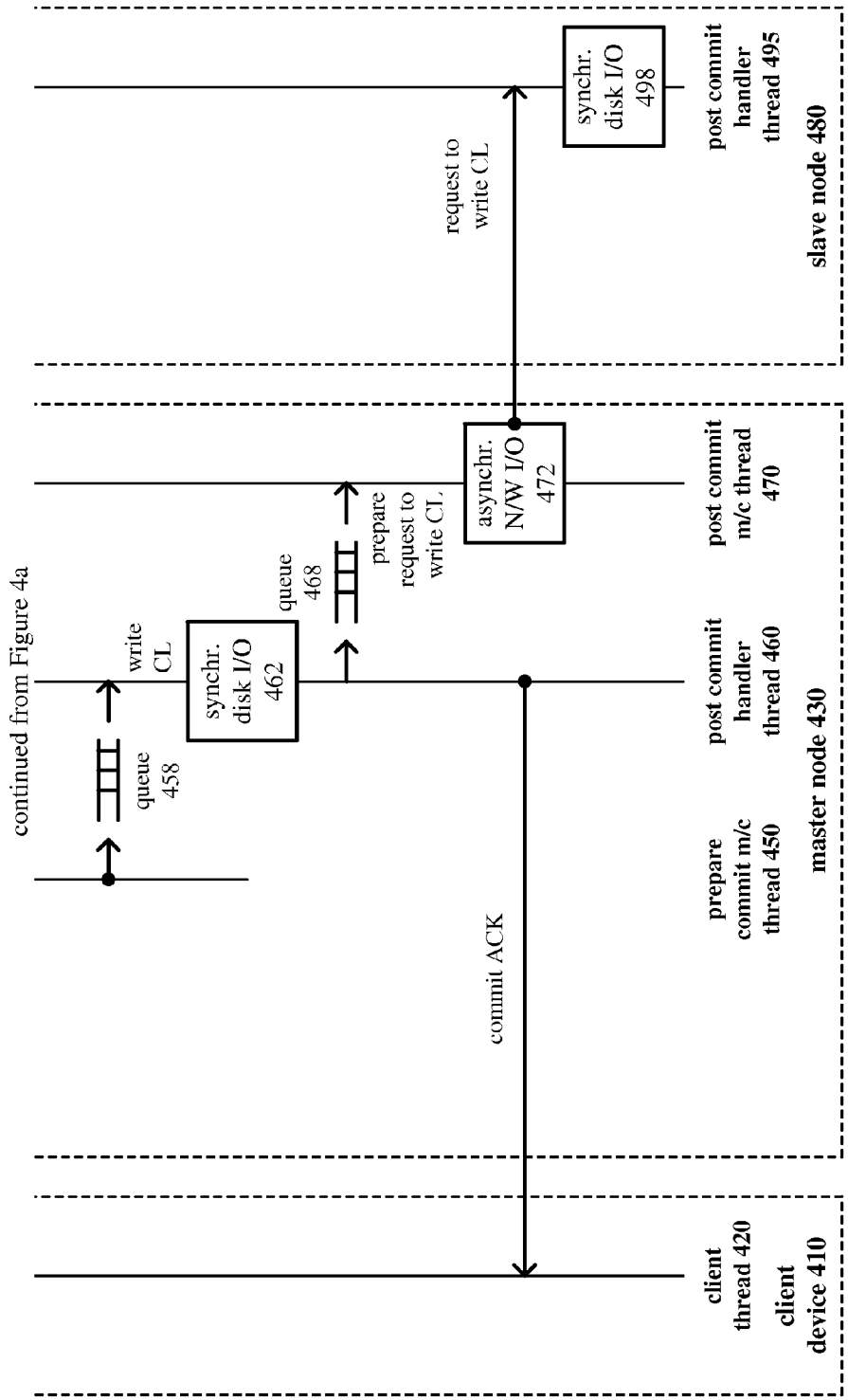

FIGS. 4a and 4b illustrate aspects of a two-phase commit protocol (400) with thread decoupling and grouping of I/O requests. The protocol can be implemented in a database environment such as the environment (300) shown in FIG. 3.

At a client device (410), a client thread (420) sends a request to commit transactions to the master node (430). The client thread (420) can then send one or more other requests to commit transactions to the master node (430) or other master nodes. Concurrently, other client threads at other client devices can send requests to commit transactions to the master node (430).

At the master node (430), an executor thread (440) (e.g., SQL executor thread) processes the request to commit transactions. The executor thread (440) manages writing of a prepare commit log ("PCL") to disk at the master node (430) as part of synchronous disk I/O (442). The PCL includes log queue entries for transactions, which are flushed to disk. Disk I/O wait time can be hidden by writing the PCL to an in-memory log buffer during earlier processing (e.g., for updates or inserts before the commit request at commit time). Then, when the commit request is received, the synchronous disk I/O (442) is completed faster. This can reduce average disk I/O wait time in many cases if the incoming workload is continuous and concurrent.

The master node (430) also sends a request to write PCL(s) to the slave node (480), using a synchronous network I/O (452) request, then waits for a response. In FIG. 4a, the executor thread (440) defines a job to write the PCL, then pushes the job to a queue (448). Other executor threads can concurrently define PCL write jobs and push them to the queue (448). After pushing the PCL write job to the queue (448), the executor thread (440) can be released, so that it is available to handle other client requests instead of waiting for completion of the synchronous network I/O request.

Different PCL job queues in the master node (430) can be associated with different slave nodes. For example, the executor thread (440) can push the job to the queue (448), which is associated with the slave node (480), and to another PCL job queue (not shown) that is associated with another slave node. More generally, each slave node can have a corresponding PCL job queue in the master node. If a commit transaction relates to changes to data at slave node 1 then a job is pushed to a queue for slave node 1, if the commit transaction relates to changes to data at slave node 2 then the job is also pushed to a queue for slave node 2, and so on.

A dedicated I/O handling thread, the prepare commit multicaster thread (450) in FIG. 4a, wakes up when a job is pushed to the queue (448) and pops any and all jobs in the queue (448). The prepare commit multicaster thread (450) prepares a request for the group of jobs popped from the queue (448) (requesting that PCLs for the jobs be written to disk) and sends the request to the slave node (480). The request is sent using synchronous network I/O (452), so the prepare commit multicaster thread (450) waits for a response before continuing. By using a single synchronous I/O request for the transaction group, network traffic is reduced. Also, by sending the request and awaiting the response with the prepare commit multicaster thread (450), executor threads can concurrently utilize processing resources to handle other client requests.

The prepare commit multicaster thread (450) can similarly send PCL job requests to one or more other slave nodes, requesting that the PCL(s) for the job(s) be written to disk at the other slave node(s). Different prepare commit multicaster threads can be associated with different PCL job queues for slave nodes, or a set of multiple prepare commit multicaster threads can collectively handle synchronous network I/O requests for a set of PCL job queues for slave nodes, such that synchronous network I/O requests are processed in parallel for different slave nodes.

At the slave node (480), the PCL(s) are written to disk using synchronous disk I/O (492). As shown in FIG. 4a, a prepare commit handler thread (490) manages writing of PCL(s) for the job(s) of the request to disk at the slave node (480). For the transactions in the group, the prepare commit handler thread (490) writes the PCL(s) to an in-memory log buffer. The prepare commit handler thread (490) then triggers the synchronous disk I/O (492) once for the group, and waits for its completion. By grouping transactions in one request for the synchronous disk I/O (492), the prepare commit handler thread (490) can reduce overall wait time.

After completion of the synchronous disk I/O (492), the prepare commit handler thread (490) sends a response to the master node (430).

At the master node (430), the prepare commit multicaster thread (450) receives the response as part of the synchronous network I/O (452). As shown in FIG. 4b, the prepare commit multicaster thread (450) defines one or more jobs to write one or more commit logs ("CLs") for the transactions to disk, then pushes the job(s) to a queue (458). Other threads can concurrently define CL write jobs and push them to the queue (458). After pushing the CL write job(s) to the queue (458), the prepare commit multicaster thread (450) can be released, so that it is available to handle other synchronous network I/O requests, which may have accumulated in the queue (448) during synchronous network I/O (452).

The post commit handler thread (460) manages writing of a group of CLs to disk at the master node (430). The post commit handler thread (460) pops any write CL jobs from the queue (458). For the transactions in the group, the post commit handler thread (460) writes the CL(s) to an in-memory log buffer. The post commit handler thread (460) then triggers the synchronous disk I/O (462) once for the group, and waits for its completion. Subsequently (but either before or after the request to write the CLs has been sent to the slave node; see below), the post commit handler thread (460) sends an acknowledgement to the client. Similarly, when committing a group of non-distributed transactions, the post commit handler thread (460) triggers the synchronous disk I/O (462) once for the group, waits for its completion, and sends an acknowledgement to the client. By grouping transactions in one request for the synchronous disk I/O (462), the post commit handler thread (460) can reduce overall wait time. Also, by using the post commit handler thread (460) to manage the synchronous disk I/O (462), the executor threads remain free to concurrently handle other client requests.

The master node (430) sends a request to write CL(s) to the slave node (480), using an asynchronous network I/O (472) request. After completion of the synchronous disk I/O (462), the post commit handler thread (460) defines job(s) to write CL(s) for the transactions to disk, then pushes the job(s) to a queue (468). After pushing the CL write job(s) to the queue (468), the post commit handler thread (460) can be released, so that it is available to handle other synchronous disk I/O requests, which may have accumulated in the queue (458).

Different CL job queues in the master node (430) can be associated with different slave nodes. For example, the post commit handler thread (460) can push a job to the queue (468), which is associated with the slave node (480), and to another CL job queue (not shown) that is associated with another slave node.

Another dedicated I/O handling thread, the post commit multicaster thread (470) in FIG. 4b, wakes up when a job is pushed to the queue (468) and pops any and all jobs in the queue (468). The post commit multicaster thread (470) prepares a request for the group of jobs popped from the queue (468) (requesting that CL(s) for the job(s) be written to disk) and sends the request to the slave node (480). The request is sent using asynchronous network I/O (472), so the post commit multicaster thread (470) does not wait for a response before continuing. Again, by using a single I/O request for the transaction group, network traffic is reduced. And, by using the post commit multicaster thread (470) to manage the asynchronous network I/O (472), the post commit handler thread (460) can send the acknowledgement to the client sooner.

The post commit multicaster thread (470) can similarly send requests to one or more other slave nodes, requesting that the CL(s) for the job(s) be written to disk at the other slave node(s). Different post commit multicaster threads can be associated with different CL job queues for slave nodes, or a set of multiple post commit multicaster threads can collectively handle asynchronous network I/O requests for a set of CL job queues for slave nodes, such that asynchronous network I/O requests are processed in parallel for different slave nodes.

At the slave node (480), the CL(s) are written to disk using synchronous disk I/O (498). As shown in FIG. 4b, a post commit handler thread (495) manages writing of CL(s) for job(s) of the request to disk at the slave node (480). For the transactions in the group, the post commit handler thread (495) writes the CL(s) to an in-memory log buffer. The post commit handler thread (495) then triggers the synchronous disk I/O (498) once for the group, and waits for its completion. By grouping transactions in one request for the synchronous disk I/O (498), the post commit handler thread (495) can reduce overall wait time. Note that an acknowledgement for the commit request has already been sent to the client. If the slave node (480) crashes between the time the CL(s) are written to disk at the master node (430) and the time the CL(s) are written to disk at the slave node (480), the transactions can be committed again at the slave node (480) using in-doubt transaction handling based on transaction information from the master node (430).

In summary, thread decoupling and request grouping as described with reference to FIGS. 4a and 4b can improve throughput in a distributed database system, especially if the workload is continuous and concurrent. In such scenarios, even for a non-concurrent, single request (which can be handled as a group that contains one job), thread switching overhead and intermediate queuing add only negligible delay to response time. On the other hand, when requests are concurrently received from one or more clients, thread decoupling allows executor threads to be active more often, and consume processing resources more efficiently, because they do not wait for I/O completion. This is especially helpful if I/O is a bottleneck. Grouping jobs for disk I/O and network I/O reduces the number of I/O requests, so system resources are used more efficiently, which is especially helpful if there are a large number of jobs. Finally, by using dedicated I/O handling threads, thread creation costs can be reduced, which also helps overall system performance.

III. Example Techniques for Thread Decoupling at a Master Node.

Figure 5:
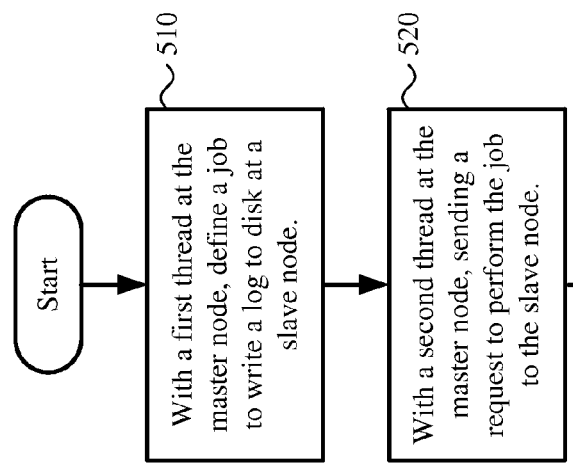
FIG. 5 is a flowchart illustrating a generalized technique for a stage of a transaction commit protocol with thread decoupling at a master node.

FIG. 5 shows a generalized technique (500) for a stage of a transaction commit protocol with thread decoupling at a master node. A server that operates a master node can perform the technique (500). Alternatively, another server performs the technique (500).

At a master node of a database system, the server receives a request to commit transactions to disk and performs operations to commit the transactions to disk. In particular, with a first thread at the master node, the server defines (510) a job to write a log to disk at a slave node of the database system. With the first thread, the server can push the job to a queue at the master node. Different slave nodes can have different queues at the master node. The first thread can then be released.

With a second thread at the master node, the server sends (520) a request to perform the job to the slave node. The second thread can wake up when a job is pushed to the queue, pop any jobs from the queue, and group the jobs as part of the request. In this case, the request includes, as a group, any jobs from the queue.

For example, the log is a prepare commit log ("PCL"). In this case, the request that is sent to the slave node can be a synchronous I/O request, and the second thread can wait for a response to the request sent to the slave node. After the response is received, the server can write a commit log ("CL") to disk at the master node as part of a synchronous disk I/O request.

Or, as another example, the log is a CL. In this case, the request that is sent to the slave node can be an asynchronous I/O request, and the second thread can continue without waiting for a response to the request sent to the slave node. Regardless of any response to the request, the server can send (to the client) an acknowledgement of the request to commit transactions.

Alternatively, the log is some other type of log.

Figure 6:
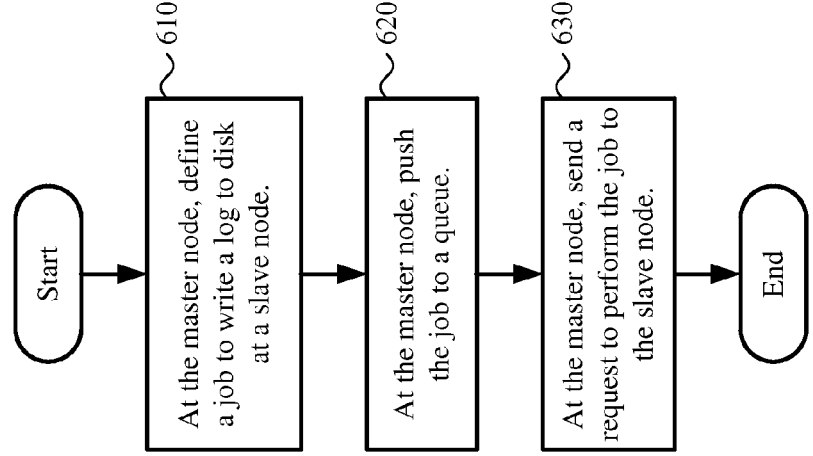
FIG. 6 is a flowchart illustrating a generalized technique for a stage of a transaction commit protocol with grouping of I/O requests at a master node.

The technique (500) can be performed in conjunction with the technique (600) shown in FIG. 6, using a queue for jobs as explained above. Alternatively, the technique (500) can be performed without grouping of I/O requests.

IV. Example Techniques for Grouping of I/O Requests at a Master Node.

FIG. 6 shows a generalized technique (600) for a stage of a transaction commit protocol with grouping of I/O requests at a master node. A server that operates a master node can perform the technique (600). Alternatively, another server performs the technique (600).

At a master node of a database system, the server receives a request to commit transactions to disk and performs operations to commit the transactions to disk. In particular, the server defines (610) a job to write a log to disk at a slave node of the database system. The log can be a PCL or CL, as described above, or some other type of log. The server pushes (620) the job to a queue.

The server sends (630) a request to perform the job to the slave node. The request can include, as a group, any jobs from the queue. The request can be a synchronous network I/O request (e.g., for a PCL write request) or an asynchronous network I/O request (e.g., for a CL write request).

The technique (600) can be performed in conjunction with the technique (500) shown in FIG. 5. For example, a first thread at the master node performs the defining (610) and the pushing (620), and a second thread at the master node performs the sending (630). Or, the technique (600) can be performed with a single thread.

V. Example Techniques for Grouping of I/O Requests at a Slave Node.

Figure 7:
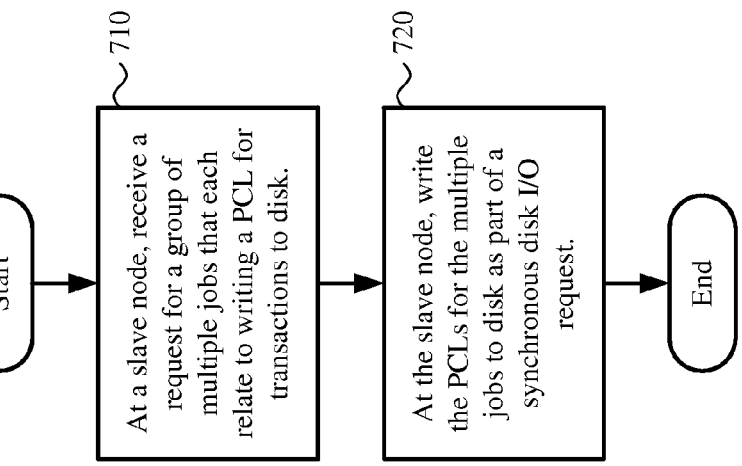
FIG. 7 is a flowchart illustrating a generalized technique for a stage of a transaction commit protocol with grouping of I/O requests at a slave node.

FIG. 7 shows a generalized technique (700) for a stage of a transaction commit protocol with grouping of I/O requests at a slave node. A server that operates a slave node can perform the technique (700). Alternatively, another server performs the technique (700).

At a slave node of a database system, the server receives (710) a request for a group of multiple jobs. Each of the multiple jobs relates to writing a PCL for transactions to disk. At the slave node, the server writes (720) the PCLs for the multiple jobs to disk as part of a synchronous disk I/O request. For example, a thread at the slave node can write the PCLs to an in-memory buffer then trigger the synchronous disk I/O request. The thread then waits for completion of the synchronous disk I/O request.

VI. Combined Implementation for a Two-Phase Commit Protocol.

Figure 8:
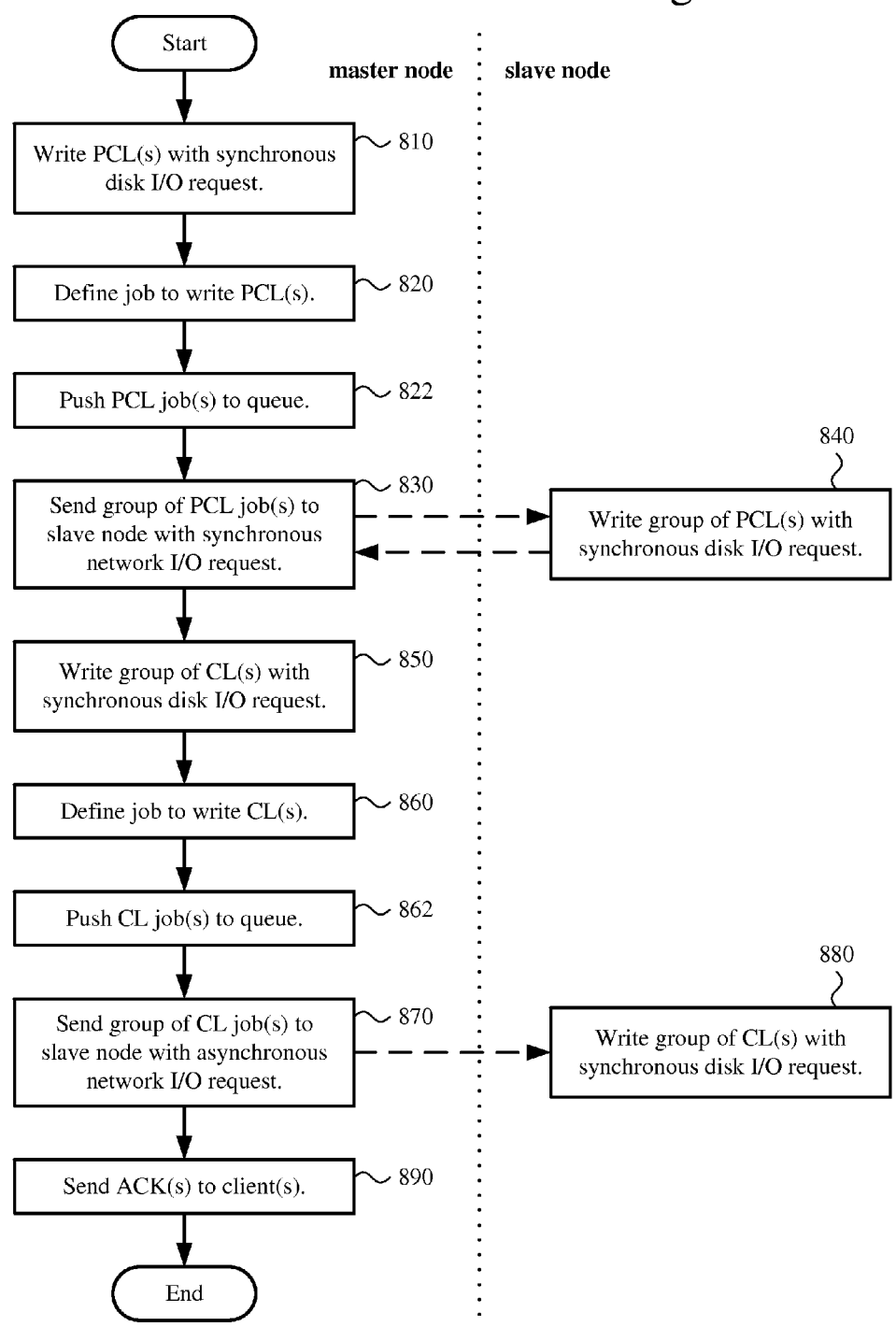
FIG. 8 is a flowchart illustrating an example technique for stages of a two-phase commit protocol with thread decoupling and grouping of I/O requests.

FIG. 8 shows an example technique (800) for stages of a two-phase commit protocol with thread decoupling and grouping of I/O requests. A server that operates a master node can perform some of the operations of the technique (800), and a server that operates a slave node can perform the other operations of the technique (800). Alternatively, one or more other servers perform operations of the technique (800).

At a master node, after receiving one or more requests to commit transactions, a first server writes (810) one or more PCLs to disk with a synchronous disk I/O request. The first server defines (820) one or more jobs to write the PCL(s) to disk at a slave node and pushes (822) the PCL job(s) to a queue. For example, a single thread (such as an executor thread) at the master node can manage the writing (810) and perform the defining (820) and the pushing (822).

At the master node, the first server sends (830) a synchronous network I/O request for the group with the PCL job(s) to the slave node. For example, a dedicated I/O handling thread (such as a prepare commit multicaster thread) at the master node performs the sending (830). At the slave node, a second server writes (840) the group of PCL(s) to disk with a synchronous disk I/O request, then sends a response to the master node.

At the master node, after receiving the response, the first server writes (850) a group of one or more commit logs ("CLs") to disk with a synchronous disk I/O request. The first server defines (860) one or more jobs to write the CL(s) to disk at the slave node and pushes (862) the CL job(s) to another queue. For example, another dedicated thread (such as a post commit handler thread) at the master node can manage the writing (850) and perform the defining (860) and the pushing (862).

At the master node, the first server sends (870) an asynchronous network I/O request for the group with the CL job(s) to the slave node. For example, a dedicated I/O handling thread (such as a post commit multicaster thread) at the master node performs the sending (870). At the slave node, the second server writes (880) the group of CL(s) to disk with a synchronous disk I/O request. Concurrently, the first server at the master node sends (890) one or more acknowledgements to clients in response to the request(s) to commit transactions.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more tangible computer-readable media storing computer-executable instructions for causing a server programmed thereby to perform a method at a master node of a database system, the method comprising:
 for each of multiple database transactions, receiving from one or more database clients one or more operations to manipulate data stored in the database system;
 receiving one or more requests to commit the multiple database transactions to disk; and
 performing operations to commit the multiple transactions to disk, including:
  with a first thread at the master node:
   writing a first prepare log to disk at the master node for a first transaction of the multiple transactions;
   defining a first job to direct a slave node of the database system to write a first prepare commit log to disk, the first prepare commit log being for at least a portion of the one or more operations of the first transaction;

enqueuing the first job in a queue maintained by the master node, the queue comprising a data structure, physically stored in memory, configured to store a plurality of jobs, the enqueuing comprising storing the job in the data structure; and after enqueuing the first job, releasing the first thread;

with a second thread at the master node, which may be the first thread after having been released after enqueuing the first job:

writing a second prepare log to disk at the master node for a second transaction of the multiple transaction;

defining a second job to direct the slave node to write a second prepare commit log to disk, the second prepare commit log being for at least a portion of the one or more operations of the second transaction;

enqueuing the second job in the queue; and after enqueuing the second job, releasing the second thread;

with a third thread at the master node:

dequeuing the first and second jobs from the queue, the dequeuing comprising removing the first and second jobs from the data structure;

grouping the first and second jobs in a single request to be sent to the slave node; and sending the request to perform the first and second jobs to the slave node, the slave node processing the first and second jobs after receiving the request, writing the first and second prepare commit logs, and sending an acknowledgement to the master node that the first and second prepare commit logs were written;

receiving the acknowledgement from the slave node;

committing the first and second transactions at the master node;

writing a commit log for the first transaction at the master node;

writing a commit log for the second transaction at the master node; and sending commit acknowledgements to the one or more database clients for the first and second transactions.

2. The one or more computer-readable media of claim 1 wherein the third thread wakes when any jobs are enqueued in the queue, and wherein the request includes as a group any jobs from the queue.

3. The one or more computer-readable media of claim 1 wherein the server has a number of logical cores, the number of logical cores being at least one, and an executor thread is associated with each of the logical cores, respectively, of the server, the first thread and the second thread being among the number of executor threads.

4. The one or more computer-readable media of claim 1, further comprising sending an asynchronous network request to the slave node to commit the first transaction.

5. The one or more computer-readable media of claim 4 wherein a thread sending the asynchronous network request does not wait for a response to the asynchronous network request sent to the slave node.

6. The one or more computer-readable media of claim 5 wherein the master node writes the commit log for the first transaction to disk as part of a synchronous disk access request.

7. The one or more computer-readable media of claim 1 wherein the request sent to the slave node is a synchronous network request.

8. The one or more computer-readable media of claim 7 wherein the third thread waits for a response to the synchronous network request sent to the slave node.

9. The one or more tangible computer-readable media of claim 1, wherein the database system comprises multiple slave nodes and the master node maintains separate job queues for each of the multiple slave nodes.

10. The one or more tangible computer-readable media of claim 1, wherein the master node sends requests to multiple slave nodes in parallel.

11. The one or more tangible computer-readable media of claim 1, wherein the master node writes the commit logs for the first and second transactions in a single disk access request.

12. A method comprising, at a slave node of a database system:

receiving, from a master node of the database system, a request comprising a first job, the first job directing the slave node to write a first prepare commit log for at least a first transaction, and a second job, the second job directing the slave node to write a second prepare commit log for at least a second transaction, the at least a first transaction and the at least a second transaction each comprising one or more operations to manipulate data of the database system, wherein the at least a first transaction and the at least a second transaction, and the respective one or more operations of the at least a first transaction and the at least a second transaction, are processed atomically as independent units, the request being sent by the master node after the master node has written prepare commit logs for the at least a first transaction and the at least a second transaction;

writing the prepare commit log for the at least a first transaction and the prepare commit log for the at least a second transaction to disk as part of a common synchronous disk access request;

sending a prepare commit acknowledgment to the master node, wherein the master node commits the at least a first transaction and the at least a second transaction after receiving the prepare acknowledgement from the slave node;

receiving a commit request from the master node; and writing a commit log for the at least a first transaction and a commit log for the at least a second transaction.

13. The method of claim 12 wherein a thread at the slave node writes the first and second prepare commit logs to an in-memory buffer then triggers the synchronous disk access request.

14. The method of claim 13 wherein the thread waits for completion of the synchronous disk access request.

15. A server comprising a processing unit and memory, wherein the server is adapted to operate a master node of a database system, and wherein the server is adapted to perform a method comprising:

receiving one or more requests to commit at least a first transaction and at least a second transaction, the at least a first transaction and the at least a second transaction each comprising one or more operations to manipulate data of the database system, to disk;

performing operations to commit the at least a first transaction and the at least a second transaction to disk, including:

defining a first job to direct a slave node of the database system to write a first log to disk at the slave node for the at least a first transaction, the at least a first transaction executed at least in part at the slave node and to be committed at the slave node;

pushing the first job to a commit processing queue maintained at the master node, the queue comprising a data structure, physically stored in the memory, capable of storing a plurality of jobs, and the pushing comprising storing the job in the data structure;

defining a second job to direct the slave node to write a second log to disk at the slave node for the second transaction, the at least a second transaction executed at least in part at the slave node and to be committed at the slave node;

pushing the second job to the commit processing queue;

dequeuing the first and second jobs from the commit processing queue, the dequeuing comprising removing the first and second jobs from the data structure;

grouping the first and second jobs into a request;

sending the request to the slave node, wherein the slave node writes a log for the first job and a log for the second job, corresponding to the at least a first transaction and the at least a second transaction;

committing the at least a first transaction and at least a second transaction at the slave node; and sending commit acknowledgements to one or more database clients indicating the commit of the at least a first and at least a second transactions.

16. The server of claim 15 wherein the logs of the first and second jobs are prepare commit logs, and wherein the request is a synchronous network request.

17. The server of claim 15 wherein the logs of the first and second jobs are commit logs, and wherein the request is an asynchronous network request.

18. The server of claim 15 wherein first and second threads, where the second thread can be the first thread after the first thread was released following pushing of the first job, at the master node perform the defining and the pushing, and wherein a third thread at the master node, which is not the first thread or the second thread, performs the sending.

19. The server of claim 15, wherein the database system comprises multiple slave nodes and the server maintains separate commit processing queues for each slave node.

20. The server of claim 15, wherein the server writes commit logs for the at least a first transaction and the at least a second transaction in a single disk access request.

* * * * *